3,810,834
TREATMENT OF WATER OR AQUEOUS SYSTEMS
Thomas Ivor Jones, Poynton, Norman Richardson, Middleton, Manchester, and Arthur Harris, Poynton, England, assignors to Ciba-Geigy Corporation, Ardsley, N.Y.
No Drawing. Filed Nov. 26, 1971, Ser. No. 202,628
Claims priority, application Great Britain, Nov. 30, 1970, 56,760/70
Int. Cl. C02b 5/06
U.S. Cl. 210—58                    4 Claims

ABSTRACT OF THE DISCLOSURE

Hydrolysed polymaleic anhydride is used for the treatment of water or aqueous systems containing dissolved salts of metals in order to cut down the rate at which insoluble salts are formed and to modify their nature.

---

The majority of natural waters, and aqueous systems in general, contain dissolved salts of metals such as calcium and magnesium. When the water or aqueous system is subjected to heating, for example, the heating of boiled feed water or process cooling water, or during the desalination of sea water by distillation, the dissolved salts may be converted to insoluble salts and deposited as scale on heat-transfer surfaces. If the water or aqueous system is concentrated without heating, insoluble salts may also be precipitated but will not necessarily be deposited in the same way; they can still reduce the efficiency of the process, however, as for example in reverse osmosis processes where reduction of the efficiency of the process is presumably due to blockage of the membrane. The present invention is concerned with a product which can be added to water or aqueous systems in very small quantities and which then cuts down the rate at which insoluble salts are formed, and also modifies their nature so that they do not deposit so readily as adherent scale in processes involving heat. Furthermore, when any such scale is formed, it is then easily removable from heat-transfer surfaces by mechanical means.

A number of additives have been proposed for addition to water or aqueous systems for these purposes, among them certain polyphosphates, and polycarboxylic acids, such as polyacrylic acid and polymethacrylic acid. The polyphosphates ultimately give a soft friable scale which is easily removed from surfaces, whereas the use of polycarobxylic acids results in a hard adherent eggshell-like scale. Where water-treatment processes involving heat are used, the temperatures involved are increasing, and since polyphosphate additives are readily hydrolysed at high temperatures, their usefulness is limited. Apart from its other desirable properties, our product is resistant to hydrolysis. In reverse osmosis processes in which our product is used, the membrane is found to have a longer life than is the case when these other additives are used.

Polymaleic anhydride is a known compound, and may be prepared by a number of routes of polymerisation. British patent specification No. 1,024,725, for example, describes and claims a process for the manufacture of polymaleic anhydride, wherein maleic anhydride is dissolved in an inert organic solvent and polymerized under the action of a free radical polymerisation catalyst, and British Pat. No. 1,193,146 describes and claims a method of producing polymaleic anhydride at a high yield in which maleic anhydride is polymerised at 70 to 120° C. for at least 3 hours by using toluene as solvent and 0.02 to 0.2 mols, of benzoyl peroxide as polymerisation initiator per mol of the fed maleic anhydride.

Polymerised maleic anhydride, prepared in these or other ways, may be hydrolysed very readily, for example by heating with water, to form a polymeric product which contains free carboxylic acid groups, and possibly some residual anhydride groups, on a carbon backbone; the product is not pure polymaleic acid. The actual structure of the product is not known yet, and so this type of polymeric product formed by hydrolysing polymerised maleic anhydride will be referred to in this specification as hydrolysed polymaleic anhydride. The material as used in this invention and referred to herein as hydrolysed polymaleic anhydride, is prepared in particular from polymer obtained by the addition polymerisation of a monomer feed consisting essentially of maleic anhydride, under bulk or solution polymerisation conditions. The main chain of the initial polymer is substantially formed of non-hydrolysable linkages. The initial unhydrolysed polymer product, when free of unreacted monomer or other non-polymeric molecular species, has a molecular weight of between 300 and 5000 when measured in dioxan solution by a Mechrolab R vapour pressure osmometer (301A), and is subsequently hydrolysed by water or a water soluble alkali, either before use or by the act of incorporation into the water to be treated.

Decarboxylation of the polymer may occur during polymerisation or subsequent hydrolysis, so that the acid value of the hydrolysed polymaleic anhydride is found to be lower than the theoretical value of 967 mgm. KOH per gram, but such decarboxylation does not proceed to such an extent that the acid value falls to below 350 mgm. KOH gram. The acid value is determined by potentiometric titration in aqueous solution against 0.1 potassium hydroxide solution, the end point being taken as the highest peak on the plot of $\Delta pH$: $\Delta V$ against V where $\Delta pH$ is the change of pH, $\Delta V$ is the change in volume and V is the volume of titre.

It is known that polymaleic acid or its water soluble salts may be used as dispersing agents to assist the dispersion of fine powders, particularly hydrophilic fine powders, in aqueous systems. The polymaleic acid or salt is normally used at 0.1 to 10% by weight based on the weight of the powder to be dispersed. It is also known that polymaleic acid and its salts are valuable alkali metal sequestering agents and are useful as chemical intermediates, as additives to other polymer systems, as textile chemicals and in the surface treatment of metals. In all of these known uses, the polymaleic acid or its salts is being used in relatively large quantities; sequestration, for example, implies the use of the sequestering agent in essentially stoichiometric proportions to the metal being sequestered. We have now found that hydrolysed polymaleic anhydride of low molecular weight and its water-soluble salts, exhibit a threshold effect in aqueous systems, that is to say they have the property of preventing or delaying the precipitation of much larger than stoichiometric amounts of dissolved metal ions as insoluble salts, and that the insoluble salts when precipitated are modified in that they are easily removed from surfaces on which they are deposited.

According to the invention, therefore, we treat water or an aqueous system with from 0.1 to 100 parts per million by weight, calculated on the water or aqueous system, of hydrolysed polymaleic anhydride having a molecular weight of 300 to 5000 as determined by calculation following osmometric measurements on the polymaleic anhydride before hydrolysis, or of a water soluble salt of such hydrolysed polymaleic anhydride. Since polymerised maleic anhydride is so readily hydrolysed, as previously indicated, to form hydrolysed polymaleic anhydride, treatment of water or an aqueous system with polymerised maleic anhydride is the same as treatment with hydrolysed polymaleic anhydride. The invention therefore includes the treatment of water or an aqueous system with such proportion of polymerised maleic anhydride as will yield the desired amount of from 0.1 to 100 parts per million of the hydrolysed polymaleic anhydride of specified molecular weight on the immediate hydrolysis which takes place.

Normally the amount of additive used will lie between 1 and 100 p.p.m., calculated on the water or aqueous system. Very satisfactory results are obtained using from 2 to 10 parts per million, and preferably from 5 to 10 parts per million.

It is important that the hydrolysed polymaleic anhydride should be of the stated low molecular weight range. As the molecular weight of the hydrolysed polymaleic anhydride is increased, so the hardness of what scale is produced increases. We prefer to use material having a molecular weight of from 500 to 2000 and have found that material having a molecular weight of about 750 is very suitable; for all intents and purposes a molecular weight of 5000 gives scales which are at the limit of acceptibility.

The molecular weight of the hydrolysed polymaleic anhydride is not readily available by direct measurement but is easily derived from that of the polymerised maleic anhydride before hydrolysis. For example, if the molecular weight of a polymerised maleic anhydride is 800, which can be measured by osmosis using dioxane as solvent, and each molecule contains seven units of anhydride, the theoretical molecular weight of the hydrolysed polymaleic anhydride prepared from it will be 800+(7×18), that is 926.

Hydrolysed polymaleic anhydride (or its precursor polymerised maleic anhydride) may be used in conjunction with other conventional water-treatment additives as desired; examples of such additives are lignin sulphonates, phosphonate-type threshold agents, foam inhibiting agents and corrosion inhibitors. Particularly good scale-reducing properties are shown when hydrolysed polymaleic anhydride (or its precursor polymerised maleic anhydride) is used in conjunction with a naphthalene sulphonic acid/ formaldehyde condensation product or with a salt of such a condensation product.

Hydrolysed polymaleic anhydride contains only C, H and O and has been shown to have low toxicity to rats. It would be expected to degrade to simple products which would not be environmentally harmful.

Some details will now be given of a number of preparations of hydrolysed polymaleic anhydride for use in the process according to the invention, all parts and percentages being by weight unless otherwise stated:

PREPARATION 1

25 parts of maleic anhydride were dissolved in 50 parts of toluene by heating to 70° C. 7.15 parts of a 70% paste of benzoyl peroxide in dimethyl phthalate (≡5 parts benzoxyl peroxide) were dissolved in 25 parts toluene and added to the maleic anhydride solution over a period of 15 minutes. The solution was then heated to 90° C. and maintained at this temperature for 5 hours. During this time, polymer was precipitated from the solution as a dark coloured tar.

After the 5 hour reaction time, the solution was cooled to 30° C. and the toluene removed by decanting. The polymer was dissolved in 5 parts methyl ethyl ketone by heating to 70° C. This solution was poured into 100 parts of stirred toluene in order to precipitate the polymer which was then filtered off and dried under vacuum at room temperature. A yield of 80% (based on maleic anhydride) was obtained. The polymer had an elemental analysis as follows:

|  | C | H | O |
|---|---|---|---|
| Found, percent | 61.11 | 4.68 | 34.21 |
| Theoretical value for poly(maleic anhydride), percent | 48.99 | 2.05 | 48.94 |

A molecular weight determination on the polymer by osmosis using dioxane as the solvent gave an approximate molecular weight of 840.

20 parts of the polymer prepared above, and 20 parts of water were heated at 90° C. for 30 minutes. The solution obtained was cooled to 30° C. and filtered. A wine-red coloured solution having a solids content of 53% was obtained. Potentiometric titration of the hydrolysed polymer against potassium hydroxide indicated that the polymer had an acid value of 560 mg. KOH/gm.; the theoretical value for polymaleic acid is 967 mg. KOH/gm.

The original polymerized maleic anhydride contained an average of 8 monomer units per molecule so that the calculated molecular weight of the hydrolysed polymaleic anhydride is approximately 984.

PREPARATION 2

250 parts of maleic anhydride were dissolved in 500 parts of toluene by heating to 70° C. To this solution was added a solution of 71.5 parts benzoyl peroxide (70% paste in dimethyl phthalate) in 250 parts toluene over a period of ½ hour. The solution was heated to 90° C. and maintained there for 5 hours, during which time polymer precipitated from the solution. Some of this polymer was isolated by the procedure described in Preparation 1 and found to have a molecular weight of approximately 470 by osmosis.

350 parts of water were then added to dissolve the polymer and the mixture stirred at 90° C. for 5 minutes. The mixture was cooled to 45° C. and a solution of 206 parts sodium hydroxide in 300 parts water added at such a rate that the temperature did not rise above 50° C. Stirring was then stopped and the mixture allowed to separate into two layers. The upper toluene layer was removed and the aqueous solution obtained stripped under vacuum, to remove any trace of toluene, then filtered. 1,100 gms. of an amber/light brown coloured solution of the sodium salt of hydrolysed polymaleic anhydride were obtained. The solution had a solids content of 45% (equivalent to 33% of the free acid). The polymaleic anhydride contained an average of 5 monomer units per molecule so that the calculated molecular weight of the hydrolysed polymaleic anhydride was approximately 560.

PREPARATION 3

50 gms. maleic anhydride were dissolved in 100 gms. toluene by warming to 70° C. 14.3 gms. benzoyl peroxide, as a 70% paste in dimethyl phthalate, dissolved in 50 gms. toluene were then added over a period of 5 minutes. The solution was then heated to 90° C. and maintained at this temperature for 5 hours during which time polymer precipitated from the solution.

A sample of the polymer was removed from the reaction vessel, dissolved in methyl ethyl ketone and reprecipitated by adding the solution to toluene with stirring. The polymer was recovered by filtration and the purification technique repeated. The polymer obtained was dried under vacuum at 50° C. for 3 days. The molecular weight of the polymaleic anhydride polymer was then determined by osmometry in dioxane as the solvent, and a value of approximately 1,480 obtained. The extra purification step presumably removes further low molecular weight impurity material without fractionating the polymer, causing the molecular weight of the polymer to be relatively higher than in previous examples.

160 gms. water were added to the solution and precipitated polymer and the mixture stirred for ¼ hour at 60° C. in order to hydrolyse and dissolve the polymer. Stirring was stopped, and the mixture allowed to separate into two layers. The upper toluene layer was removed and the remaining aqueous solution vacuum-stripped to remove traces of toluene. A red/brown solution having a solids content of 31.0% was obtained. The polymaleic anhydride contained an average of 13 monomer units per molecule so that the calculated molecular weight of the hydrolysed polymaleic anhydride was approximately 1714.

After storage at room temperature for 3 days, a crystalline precipitate was deposited from the solution. This was isolated by filtration and identified as benzyl succinic acid.

This is presumably formed by a free radical attack on the toluene, followed by addition of the resulting benzyl radical to the maleic anhydride.

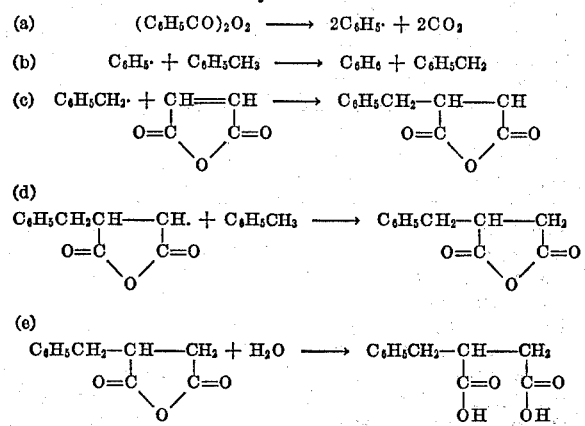

NMR spectroscopy shows that the purified polymaleic anhydride in this preparation contains only phenyl groups attached to the polymer chain, i.e. no benzyl groups derived from free radical attack upon the toluene used as solvent. Also the purified polymaleic anhydride contains no benzyl succinic anhydride as impurity. On average, in this our preferred procedure using toluene, about 15% of benzyl succinic acid is produced, its presence and nature being shown by TLC, NMR, equivalent weight and melting point 163–164° C. Toluene as a solvent for the process is therefore not an inert solvent, since it reacts with maleic anhydride under the reaction conditions.

PREPARATION 4

250 parts of maleic anhydride were dissolved in 500 parts of toluene by heating to 70° C. To this solution was added a solution of 71.5 parts benzoyl peroxide (70% paste in dimethyl phthalate) in 250 parts of toluene over 30 minutes. The solution was heated to 90° C. and maintained there for 5 hours; during this time the polymer precipitated from the solution. Some of this polymer was isolated and found to have a molecular weight of 470 approximately by osmosis.

150 parts of water were added slowly at 60° C. to the solution/precipitated polymer and the mixture stirred for 1 hour. On stopping the stirrer, a separation of the mixture into two layers was obtained. The upper toluene layer was removed and the aqueous solution was stripped under reduced pressure, to remove traces of toluene. The product was a brown colored solution of hydrolysed polymaleic anhydride with a solids content of about 70% by weight, and a calculated molecular weight of 560 as in Preparation 1.

PREPARATION 5

The procedure described in Preparation 4 was repeated except that the toluene layer was decanted off and 50 parts of methyl ethyl ketone added to dissolve the polymer at 70° C. This solution was then poured into 1,000 parts of stirred toluene. The precipitated polymer was filtered off and dried under vacuum at room temperature. Osmometric determination of molecular weight in dioxan gave 470 approximately. 20 parts of this polymer and 20 parts of water were heated at 90° C. for 30 minutes. A brown red solution of 50° solids content was produced, the hydrolysed polymaleic anhydride having a calculated molecular weight of 560 as in Preparation 1.

In these preparations, which are of methods of making hydrolysed polymaleic anhydride as the sodium salt or as what may be called the free acid, we use toluene as solvent and have not experienced any difficulties using commercial maleic anhydride (up to 4% maleic acid) and undried toluene containing up to 0.1% of water. We require a low molecular weight product, and thus add all the catalyst essentially at the beginning of the reaction. Toluene is in fact the solvent which we have found to give the best yields.

In the polymerization step we heat toluene, benzoyl peroxide and maleic anhydride together, and there occurs polymerization and slight evolution of $CO_2$.

The resulting product has many possible structures, for example those postulated in the article by Von Dietrich Braun et al., Makromolekulare Chemie, 224 (1969), pp. 249–262.

After hydrolysis the product presumably becomes:

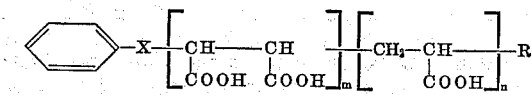

Where X is absent or is —$CH_2$—, $m$ and $n$ are integers in individual molecules, the average values of which can be estimated from the observed molecular weight of the product and its acid value, and R is likely to be H,

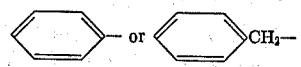

These formulae show what we believe to be the case, namely that some decarboxylation does take place in the polymerization of maleic anhydride. Yields quoted (e.g. 80% in Example 1 above) are calculated on the weight of maleic anhydride and there can be considerable weight contribution to the product from the free radical initiator used. Decarboxylation is detected by potentiometric titration and indicates the carboxylic content of the product compared to pure theoretical polymaleic anhydride. As previously explained, the product before hydrolysis can contain large amounts of residues of initiator or solvent, for example, in the form of compounds such as:

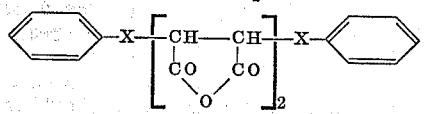

may be present, and the high apparent yield and low carboxylic content is thus explained. If a different free radical initiator or solvent were used, then clearly different end groups would be present on the chains.

The invention is applicable to all aqueous systems where insoluble salts are deposited either as scale on heat transfer surfaces or are formed in bulk water. Typical applications include steam raising boiler plant, industrial cooling water systems, desalination plants and reverse osmosis systems.

The invention is particularly applicable to sea-water which is to be desalinated by a process of flash evaporation: the production of scale is reduced and indeed in many cases substantially eliminated.

In a laboratory scale test of additives for effectiveness in preventing and modifying scale formation, sea water containing the additive under test is passed at a rate of 10 litres per day through a test cell. Steam is passed through an aluminium/brass U tube in the cell to keep the temperature at 220° C., and air is blown into the cell to agitate the contents and to facilitate the decomposition of bicarbonate in the sea water. After 14 days, the cell is stripped down, and any scale deposited on the U tube and on the cell walls is scraped off and weighed.

Tube scaling rate $$= \frac{\text{Weight of material deposited on U tube}}{\text{Total volume of water passing through the cell}}$$

Total scaling rate $$= \frac{\text{Total weight of solids deposited in the cell}}{\text{Total volume of water passing through the cell}}$$

The following results were obtained, each quoted figure for scaling rate being the average of three tests:

| Additive | Trial number | Dosage of additive in feed water | Scaling rate (milligrams/litre) Tube | Total | |
|---|---|---|---|---|---|
| None | 1 | | 13.0 | 47.0 | |
| Sodium tripolyphosphate | 2 | 1.5 p.p.m. active material | 12.0 | 33.0 | |
| 50% aqueous solution of polyacrylic acid of MW 20,000. | 3 | 10 p.p.m. =5 p.p.m. of active material | 5.6 | 29.0 | |
| 40% aqueous solution of polymethacrylate | 4 | 5 p.p.m. =2 p.p.m. of active material | 4.4 | 27.0 | Hard scale. |
| Product from Preparation 1 | 6 | 10 p.p.m. =5 p.p.m. of free acid polymer | 0.7 | 7.6 | |
| Product from Preparation 2 | 7 | 15 p.p.m. =6.75 p.p.m. of sodium salt of polymer =5 p.p.m. of free acid polymer. | 2.1 | 18.6 | Soft scale. |
| Product from Preparation 3 | 8 | 16.1 p.p.m. of solution assumed equivalent to 5 p.p.m. free acid polymer. | 2.4 | 18.4 | |

| Additive | Trial number | Dosage of additive in feed water (p.p.m.) | Scaling rate (milligrams/litre) Tube | Total | |
|---|---|---|---|---|---|
| Product from Preparation 4. | 9 | 20 | 0.9 | 10.7 | |
| | 10 | 15 | 1.1 | 9.6 | |
| | 11 | 10 | 2.9 | 24.8 | |
| | 12 | 5 | 5.3 | 29.7 | Soft scale. |
| Product from Preparation 5. | 13 | 5 | 0.4 | 11.3 | |
| | 14 | 3 | 0.4 | 7.3 | |
| | 15 | 2 | 6.1 | 21.3 | |
| | 16 | 1 | 18.2 | 39.5 | |

The hydrolysed polymaleic anhydride as free acid and as sodium salt gives low scaling rates, and such scale as is produced is acceptably soft and easily removed. In the comparative trials, using conventional materials, larger quantities were deposited, and the deposits (except in Trial No. 2) could not be removed anything like as easily by mechanical means.

In a large scale test, a rig simulates the heat input section of a flash plant. Two flash chambers are incorporated in the design to vent off carbon dioxide so that scale formation can occur, no concentration occurs in the rig and fresh sea water is fed in at the same rate as blowdown is taken out. The maximum temperature of the brine is 225° F.

The following results were obtained:

| Additive | Dose (p.p.m.) | Scaling rate (mg./l.) | O.H.T.C. (B.t.u./sq. ft./hr./° F.) Initial | Final | Length of test hrs. |
|---|---|---|---|---|---|
| 40% aqueous solution polymethacrylate | 5 | 6.0 | 600 | 450 | 1,000 |
| Sodium tripolyphosphate | 1.5 | 3.6 | 600 | 250 | 200 |
| Product from Prep. 4 | 5 | 4.4 | 730 | 270 | 1,048 |

1.5 p.p.m. of sodium tripolyphosphate is the level of addition which gives the best results; results obtained with 5 p.p.m. (a direct comparison) are worse.

It can be seen that polymethacrylate gave a high scaling rate, and a hard scale as shown by the small drop in O.H.T.C. (overall heat transfer coefficient). Sodium tripolyphosphate on the other hand gave a low scaling rate, but a scale of such form that it resulted in a big drop in O.H.T.C. over a short test. The product of Preparation 4 gave similar scaling rate and type of scale to sodium polyphosphate, but the duration of the test was some five times that for the polyphosphate.

Another test was devised to observe control of scale deposition from a natural hard water. A rig was set up to simulate part of the feed line of an industrial boiler or an economiser. London water was treated with the compound under test and then fed via a constant head device and a flow meter through a heated mild steel tube. The power to the heating coil was varied so that the outlet temperature of the water was approximately 90° C. The flow rate was approximately 1.1 l./hr.

The hardness of the water leaving the tube was monitored and at the end of 5 days the tube was removed, sectioned and the amount of scale visually assessed. The following results were obtained:

| Additive | Dose, p.p.m. | Days | Total hardness (p.p.m.) CaCO₃ | Comments |
|---|---|---|---|---|
| None | | 0 | 280 | |
| | | 2 | 172 | Thick deposit of hard yellow scale. |
| | | 3 | 180 | |
| | | 4 | 148 | |
| | | 5 | 132 | |
| Polyacrylic acid M.W. 20,000. | 10 | 0 | 288 | |
| | | 2 | 323 | Medium thick deposit of hard light coloured scale. |
| | | 3 | 212 | |
| | | 4 | 200 | |
| | | 5 | 164 | |
| Sodium tripolyphosphate. | 10 | 0 | 185 | |
| | | 2 | 135 | Very thick deposit of light colored scale. |
| | | 3 | 115 | |
| | | 4 | 135 | |
| | | 5 | 170 | |
| Product from Preparation 1. | 10 | 0 | 280 | |
| | | 2 | 280 | Very thin deposit of scale. |
| | | 3 | 255 | |
| | | 4 | 210 | |
| | | 5 | 210 | |

Further tests were carried out to demonstrate scale control in a steam raising boiler.

A small experimental boiler capable of steaming at 150 p.s.i. has four separate 1 kw. electric cartridge heaters encased in mild steel sheaths screwed through the base plate so that the sheaths are in a vertical position. Three of the heaters are permanently switched on while the fourth is used as a standby. Thermocouples are brazed into the surface of each of the sheaths to monitor any temperature changes of the surface due to scale formation.

The boiler is fed with a natural water with a total hardness of 300 p.p.m. $CaCO_3$. It is run at a constant pressure for a period of 3 weeks, during which time the water is allowed to concentrate by a factor of 30 and thereafter maintained constant by removing concentrate in the form of blowdown. At the end of a test the heater sheaths are removed and the weight and thickness of scale recorded; the average temperature increase of the heater sheath surfaces during steaming is recorded.

The following results show the advantageous effect that the product of the invention has and also that it may safely be used with other conventional, dispersant type, boiler additives.

| Treatment | Scale thickness, inch | Wt. of scale, g. | Temp. rise, ° F. |
|---|---|---|---|
| None | 0.03 | 14.7 | 110 |
| 230 p.p.m. $Na_2CO_3$ | 0.02 | 5.3 | 52.5 |
| 230 p.p.m. $Na_2CO_3$, 10 p.p.m. product of Preparation 4 | <0.001 | 0.3 | <10 |
| 230 p.p.m. $Na_2CO_3$, 10 p.p.m. product of Preparation 4, 32 p.p.m. sodium salt of naphthalene sulphonic acid/formaldehyde condensation product sold under the trademark Belloid TD | <0.001 | 0.2 | <10 |

Yet another laboratory apparatus was designed to demonstrate the excellent scale-reducing properties of an additive combination of hydrolysed polymaleic anhydride and a naphthalene sulphonic acid/formaldehyde condensation product. A mild steel heater sheath containing a 1 kw. cartridge heater is mounted in a 2-litre beaker together with a copper cooling coil, a thermocouple being mounted in the outer wall of the heater sheath to monitor the temperature of the surface of the sheath itself, and thus to give an indication of the physical form of any scale deposited on the surface and serving to insulate it.

A total of 4 liters of scale-depositing water is prepared; 2 liters of a solution of 4.0 g./liter $NaHCO_3$ (2.9 g./liter $HCO_3^-$) is mixed with 2 liters of a solution of 6.5 g./liter $Mg(NO_3)_2 \cdot 6H_2O$ (0.615 g./liter $Mg^{2+}$) containing such proportion of additive as desired calculated on the entire 4 liters. The beaker is filled with the mixture, the heater sheath is immersed, and the heater switched on. Temperature readings are taken at intervals, and as the water evaporates the beaker is topped up with the remaining 2 liters of mixture. The test is run for 5 hours, the rate of evaporation of water from the beaker being so controlled by the circulation of water in the copper cooling coil that all the remaining 2 liters of mixture is needed for topping up, that is the contents of the beaker have been concentrated by a factor of two.

At the end of the test, the heater sheath is removed from the beaker, cooled, rinsed and dried. The thickness of the scale deposit on the sheath is measured and a note made of the final temperature of the heater sheath.

The following results were obtained,

| Additive | Addition, p.p.m. | Scale thickness, inch | Final temperature, °C. |
|---|---|---|---|
| Blank | Nil | 0.010 | 140 |
| Sodium salt of naphthalene sulphonic acid/formaldehyde condensation product sold under the trademark Belloid TD | 150 | 0.009 | 140 |
| Product of Preparation 4 | 50 | 0.005 | 120 |
| Belloid TD (as above) | 150 } | 0.004 | 109 |
| Product of Preparation 4 | 50 } | | | and from these the effectiveness of the combination of additives is clearly evident, leading as it does to the deposition of less scale and better retention of heat transfer properties.

We claim:

1. A method of preventing the formation of alkali metal and alkaline earth metal scale on a surface submerged in water or an aqueous system or modifying the said scale being formed to facilitate its removal, said method comprising incorporating in the water or the aqueous system from 0.1 to 100 parts per million by weight, based on the weight of the water or the aqueous system, of a compound consisting essentially of hydrolyzed polymaleic anhydride having a molecular weight of 300 to 5000 as determined by calculation following osmometric measurements on the polymaleic anhydride before hydrolysis, or of a water soluble salt of such hydrolyzed polymaleic anhydride.

2. A process according to claim 1 in which the water or aqueous system is treated with from 1 to 100 parts per million of the hydrolyzed polymaleic anhydride or of its water soluble salt.

3. A process according to claim 2 in which the water or aqueous system is treated with from 2 to 10 parts per million of the hydrolyzed polymaleic anhydride or of its water soluble salt.

4. A process according to claim 1 in which the hydrolyzed polymaleic anhydride is used in conjunction with a naphthalene sulphonic acid/formaldehyde condensation product or with a salt of such a condensation product.

References Cited

UNITED STATES PATENTS

| | | | |
|---|---|---|---|
| 3,715,307 | 2/1973 | Johnson et al. | 210—58 |
| 3,746,641 | 7/1973 | Booth | 210—58 |
| 2,729,557 | 1/1956 | Booth et al. | 210—58 |
| 3,110,666 | 11/1963 | Hedley et al. | 210—58 |
| 2,723,956 | 1/1955 | Johnson | 210—58 |
| 3,398,092 | 8/1968 | Fields et al. | 252—180 X |

FOREIGN PATENTS

| | | |
|---|---|---|
| 1,024,725 | 4/1966 | Great Britain. |
| 1,193,146 | 5/1970 | Great Britain. |
| 642,238 | 8/1950 | Great Britain. |

SAMIH N. ZAHARNA, Primary Examiner

T. G. WYSE, Assistant Examiner

U.S. Cl. X.R.

252—180